(12) United States Patent
Perigo et al.

(10) Patent No.: US 12,334,782 B2
(45) Date of Patent: Jun. 17, 2025

(54) GROUNDING BRUSH ASSEMBLY

(71) Applicant: ABB Schweiz AG, Baden (CH)

(72) Inventors: Elio Perigo, Raleigh, NC (US); Stefan Rakuff, Raleigh, NC (US); Rajib Mikail, Raleigh, NC (US); Graham Medlin, Raleigh, NC (US); Christopher Scott, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 400 days.

(21) Appl. No.: 18/058,340

(22) Filed: Nov. 23, 2022

(65) Prior Publication Data
US 2024/0171048 A1  May 23, 2024

(51) Int. Cl.
| | |
|---|---|
| *H02K 11/40* | (2016.01) |
| *H01R 39/38* | (2006.01) |
| *H01R 39/39* | (2006.01) |
| *H02K 5/14* | (2006.01) |

(52) U.S. Cl.
CPC .......... *H02K 11/40* (2016.01); *H01R 39/381* (2013.01); *H01R 39/385* (2013.01); *H01R 39/39* (2013.01); *H02K 5/148* (2013.01)

(58) Field of Classification Search
CPC ...... H02K 11/40; H02K 5/148; H01R 39/381; H01R 39/385; H01R 39/39
USPC ........................................................ 310/245
See application file for complete search history.

(56) References Cited

U.S. PATENT DOCUMENTS

| | | | | |
|---|---|---|---|---|
| 4,954,084 | A * | 9/1990 | Pugh ..................... | H01R 39/64 439/100 |
| 5,262,694 | A * | 11/1993 | Frank .................... | H01R 39/41 310/239 |
| 5,661,356 | A * | 8/1997 | Fisher ................... | H01R 39/12 439/29 |
| 5,804,903 | A * | 9/1998 | Fisher ................... | H02K 11/40 310/221 |
| 2007/0201995 | A1* | 8/2007 | Harstad ................. | F04D 29/023 417/423.12 |
| 2009/0015083 | A1* | 1/2009 | Hsieh .................... | H02K 11/40 310/90 |
| 2009/0015112 | A1* | 1/2009 | Binder ................... | F16C 19/52 310/68 R |

(Continued)

OTHER PUBLICATIONS

CN 102375228; Mar. 2, 2016; Li, Hai-Cheng et al. (Year: 2016).*

(Continued)

*Primary Examiner* — Ahmed Elnakib
(74) *Attorney, Agent, or Firm* — Greenberg Traurig, LLP (57) ABSTRACT

A device may include a first end, a second end, and a coupler configured to extend through an aperture from a first side to a second side of a motor cover. The coupler includes a head portion, a conduit portion extending from the head portion towards the second end, and a first bore axially extending through the coupler. The device may include a brush holder extending through the first bore. The brush holder includes a cylindrical body, a socket at the first end, and a receptacle at the second end. The device may include a first lock nut including a first threaded bore axially extending through the nut. The device may be configured to enable a grounding brush to contact a motor shaft to provide a current discharge path to ground to reduce an erosion of the motor components including the motor shaft and rolling bearing elements.

20 Claims, 6 Drawing Sheets

(56) References Cited

U.S. PATENT DOCUMENTS

| | | | | |
|---|---|---|---|---|
| 2017/0369012 A1* | 12/2017 | Tenckhoff | ............... | F16H 57/00 |
| 2021/0351671 A1* | 11/2021 | Yim | ....................... | H02K 11/40 |
| 2023/0353021 A1* | 11/2023 | Lee | ....................... | H02K 5/145 |
| 2024/0063695 A1* | 2/2024 | Matthey | ................. | H01R 39/38 |
| 2024/0162792 A1* | 5/2024 | Mask III | ................... | H02K 9/06 |
| 2024/0171048 A1* | 5/2024 | Perigo | .................... | H01R 39/39 |

OTHER PUBLICATIONS https://new.abb.com/motors-generators/iec-low-voltage-motors/articles/bearing-currents. Accessed on Feb. 16, 2022.
https://www.est-aegis.com/bearing-protection-EDM-fluting.php. Acessed on Feb. 16, 2022.
https://www.vibescorp.ca/learn-about/shaft-currents/. Acessed on Feb. 16, 2022.
https://dpa-solvere.com/products?gclid=EAlalQobChMI_r6Gsu_A9wIVV8LCBB1kHADxEAAYAiAAEgJOn_D_BWE.

\* cited by examiner

GROUNDING BRUSH ASSEMBLY

FIELD

The present disclosure relates to the field of motors. More particularly, to grounding systems for, for example, motor shafts.

BACKGROUND

Typically, during motor operation, the motor shaft generates a voltage potential with respect to ground. When this voltage potential exceeds the insulation properties (i.e., dielectric strength) between the stator and the rotor, current flows through the Hertzian contact points of the roller bearing elements and electric discharge erosion (EDE) occurs at the bearing races and rolling bearing elements.

EDE can cause pitting and fluting on the bearing races. Furthermore, electric arcing can lead to hot spots and alteration of the metallurgy of the bearing components through remelting, austenitization, and retempering. Altering the metallurgy not only damages the bearing steel but also the lubricant film. Over time, the voltage spikes can rise higher and higher, thereby causing cumulative damage to the roller bearing elements and the motor. Moreover, damaged bearings cause increased vibration, leading to excessive noise, and can result in various losses stemming from repairs to operational downtime. Improved grounding systems are desirable.

SUMMARY

In some embodiments, an apparatus includes a first end, a second end. The apparatus includes a coupler configured to extend through an aperture from a first side to a second side of a motor cover. The coupler includes a head portion, a conduit portion extending from the head portion towards the second end, and a first bore axially extending through the coupler. The apparatus includes a brush holder extending through the first bore, the brush holder includes a cylindrical body, a socket at the first end, and a receptacle at the second end. The apparatus includes a first lock nut including a first threaded bore axially extending through the nut.

In some embodiments, the first bore includes a second threaded bore.

In some embodiments, the brush holder further includes a threaded outer surface.

In some embodiments, the threaded outer surface of the cylindrical body is configured to threadingly engage the first threaded bore and the second threaded bore.

In some embodiments, the conduit portion further includes a plurality of ridges. In some embodiments, the plurality of ridges is configured to mechanically bind with a surface of the motor cover to retain a position of the coupler.

In some embodiments, the coupler further includes a first threaded portion extending from the head portion towards the first end, a second threaded portion disposed on the conduit portion, a clamping portion at the first end. In some embodiments, the clamping portion is configured to engage a surface of the brush holder to retain a position of the brush holder. In some embodiments, the first lock nut is configured to threadingly engage the first threaded portion and apply a clamping force onto the clamping portion to retain the position of the brush holder relative to the coupler.

In some embodiments, the apparatus includes a second lock nut including a third threaded bore. In some embodiments, the second lock nut is configured to threadingly engage the second threaded portion at the second side of the motor cover to retain a position of the coupler relative to the motor cover.

In some embodiments, the apparatus includes a grounding brush and a spring element. In some embodiments, the spring element is configured to apply a spring force onto the grounding brush and the receptacle. In some embodiments, the spring force enables the grounding brush to contact a surface of a motor shaft.

In some embodiments, the coupler includes a press-fit nut.

In some embodiments, the first lock nut is configured to retain an axial position of the brush holder relative to the coupler.

In some embodiments, a device includes a first end, a second end, a press-fit nut configured to extend through an aperture from a first side of a motor cover to a second side of the motor cover, the press-fit nut including a head portion, a conduit portion configured to extend into the aperture towards the second end, and a first bore extending from the first end to the second end, the conduit portion is further configured to engage a surface of the motor cover to retain a position of the press-fit nut in the aperture, a brush holder configured to extend through the first bore, the brush holder including a cylindrical body, a socket at the first end, and a receptacle at the second end, a first lock nut including a first threaded bore extending through the first lock nut, a grounding brush, and a spring element, wherein the spring element is configured to apply a spring force onto the grounding brush and the receptacle, wherein the spring force enables the grounding brush to contact a surface of a motor shaft.

In some embodiments, the first bore includes a second threaded bore.

In some embodiments, the brush holder further includes a threaded outer surface, wherein the threaded outer surface of the brush holder is configured to threadingly engage the first threaded bore and the second threaded bore.

In some embodiments, the press-fit nut further includes a first threaded portion between the head portion and the first end, a second threaded portion between the conduit portion and the second end, and a clamping portion at the first end, wherein the clamping portion is configured to engage a surface of the brush holder to retain a position of the brush holder, wherein the first lock nut is configured to threadingly engage the first threaded portion at the first end and to apply a clamping force onto the clamping portion to retain the position of the brush holder relative to the press-fit nut.

In some embodiments, the device includes a second lock nut including a third threaded bore, wherein the second lock nut is configured to threadingly engage the second threaded portion at the second side of the motor cover to retain the position of the press-fit nut.

In some embodiments, the conduit portion further includes a plurality of ridges traversing an outer circumference of the conduit portion, wherein the plurality of ridges is configured to mechanically bind with the surface of the motor cover to retain the position of the press-fit nut.

In some embodiments, the first lock nut is configured to retain an axial position of the brush holder relative to the press-fit nut.

In some embodiments, an assembly includes a first end, a second end, a press-fit nut configured to extend through an aperture from a first side to a second side of a motor cover, the press-fit nut including a head portion adjacent the first end, a conduit portion extending from the head portion towards the second end, and a first bore axially extending through the press-fit nut, a brush holder configured to extend through the first bore, the brush holder including a cylindrical body, a socket at the first end, and a receptacle at the second end, a first lock nut including a first threaded bore axially extending through the first lock nut, wherein the first lock nut is configured to retain an axial position of the brush holder relative to the press-fit nut.

In some embodiments, the assembly further includes a grounding brush, a spring element, wherein the spring element is configured to apply a spring force onto the grounding brush and the receptacle, wherein the spring force enables the grounding brush to contact a surface of a motor shaft.

In some embodiments, the first bore includes a second threaded bore.

In some embodiments, the brush holder further includes a threaded outer surface, wherein the threaded outer surface of the brush holder is configured to threadingly engage the first threaded bore and the second threaded bore.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

The rotational components of the electric motor are an essential part of the electromechanical energy conversion. If the rotor is not properly grounded, the induced voltage and the stray capacitance from rotor body to motor chassis can form an alternate current path and generate common mode and differential mode voltages, which in turn can generate higher voltage spikes at faster switching transients. Various types of roller bearings, which are known in the prior art, may be used in the motor construction to reduce the voltage potential at the roller bearing elements. Insulated bearings may be installed in motors to help reduce the voltage potential at the motor shaft and roller bearings. Insulated bearings are constructed with insulated coatings on the outer or inner rings. Alternatively, hybrid bearings constructed of non-conductive ceramic materials may be installed in the motor. However, these roller bearings have a higher cost compared to traditional (steel-based) bearings and are typically only selected for certain applications. Another approach, which is known in the prior art, is to actively limit the currents in the drives using filtering. The filters primarily protect the components within the drives itself. However, filtering does not preclude the voltage spikes and arcs from occurring within the bearing and continuing to damage the bearing.

Carbon brushes and Aegis ring(s) may also be used to ground the motor shaft from the voltage spikes. Carbon brushes contact an outer radial surface of the shaft. When the brush is in contact with the angular surface of the shaft, maximum speed is present, impacting the durability of the carbon brush element. Aegis ring(s) are installed outside the motor frame, and bristles contact the outer radial surface of the shaft. However, Aegis ring(s) are typically used for motors with power ranges above 5 horsepower (hp). Furthermore, although carbon brushes are more economically practical compared to Aegis ring(s), the installation of carbon brushes can impact the total cost of the solution. Moreover, Aegis rings require a higher upfront investment combined with demanding effort to install the Aegis ring(s) on the motor.

Figure 1:
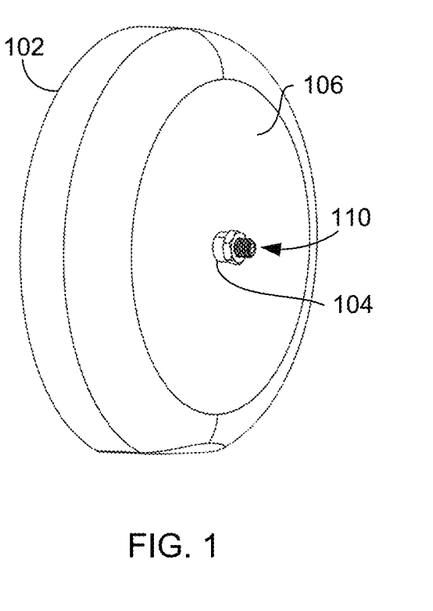
FIG. 1 is a first perspective view of a motor cover 102 and a device 100 extending therethrough, according to some embodiments.
Figure 2:
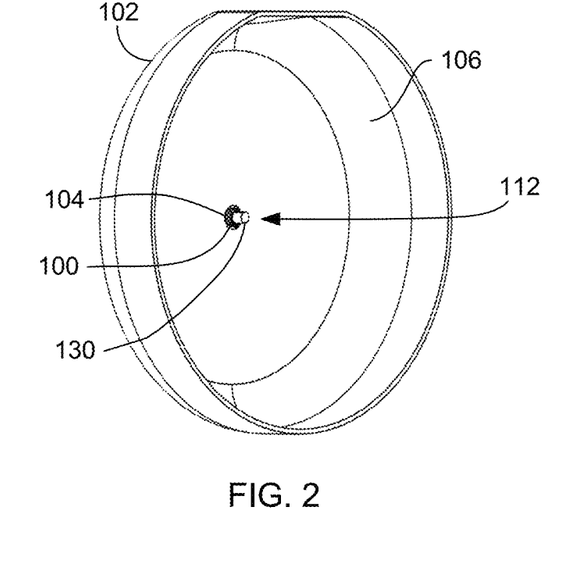
FIG. 2 is a second perspective view of the motor cover 102 and the device 100 extending therethrough, according to some embodiments.

FIG. 1 is a first perspective view of a motor cover 102 and a device 100 extending therethrough, according to some embodiments. FIG. 2 is a second perspective view of the motor cover 102 and the device 100 extending therethrough, according to some embodiments. Unless stated otherwise, FIGS. 1 and 2 will be described collectively.

A device 100 is configured to engage a surface of a motor shaft when installed into a motor to provide a discharge path for the voltage potential that develops due to rotation of the components during motor operation. The device 100 described herein can be installed in a motor without being glued or welded. The device 100 includes a compact design that enables the device 100 to be installed into a plurality of motors having different motor frame sizes. The design of the device 100 also provides for simplified installation, thereby reducing costs related to manufacturing and installation. In various embodiments, the device 100 may also be referred to as an assembly, apparatus, grounding device, grounding assembly, grounding brush assembly, or the like.

The device 100 is connected to ground to provide a discharge path for current. In some embodiments, the device 100 may include a connector that may be connected to a ground terminal. In some embodiments, the device 100 may be connected to a grounded member to provide the discharge path to ground. In some embodiments, the device 100 may be installed into a motor cover 102 that is grounded and the device 100 may engage a conductive metallic surface of the motor cover 102 to provide the discharge path to ground.

The motor cover 102 includes a first side 106, a second side 108, and an aperture 104. The aperture 104 extends through the motor cover 102 from the first side 106 to the second side 108. The motor cover 102 protects a motor's internal components from foreign objects and protects users from the motor components. The motor cover 102 may also include a discharge path to ground to reduce the risk injury to personnel stemming from current discharge or some other fault.

In various embodiments, the motor cover 102 may be configured to attach to any of a plurality of components including, but not limited to, a motor frame, other motor covers, grounding connector, grounding conductor, other components, or any combinations thereof. In some embodiments, the motor may include a casing and the motor cover 102 may be a portion of the casing. In some embodiments, the motor cover 102 may be one of a plurality of motor covers encasing the motor. In some embodiments, the motor cover 102 may be configured to be installed onto the motor adjacent a motor shaft. In some embodiments, the motor cover 102 may be a motor fan cover. Consequently, in some embodiments, the motor cover 102 may include one or more vents to allow circulation of air in/out of the motor to cool the motor components.

The device 100 includes a first end 110 and a second end 112 opposite the first end 110 of the device 100. The device 100 is configured to be installed into the motor cover 102 such that the device 100 extends through the aperture 104 and the device 100 extends from the first side 106 to the second side 108 of the motor cover 102. In some embodiments, the device 100 is configured to axially extend through the aperture 104 and out from a surface of the second side 108 towards the motor shaft. In some embodiments, the device 100 may be configured to extend from the surface of the second side 108 and out towards the motor shaft to contact a surface of the motor shaft as will be further discussed below. In various embodiments, a position of one or more members that form the device 100 may be adjustable to enable the device 100 to be installed into motors of various sizes and where a distance between the motor cover 102 and the motor shaft may vary. This enables the device 100 to adjustably extend from the motor cover 102 to the motor shaft to provide a grounded discharge path as will be further discussed below.

The aperture 104 is in colinear alignment with the motor shaft to enable the device 100 to contact an end surface of the motor shaft and to provide a discharge path to ground. Accordingly, the device 100 may be positioned in the aperture 104 to be in colinear alignment with the motor shaft to enable the device 100 to contact the surface of the motor shaft when the device 100 is installed into the motor. In some embodiments, the aperture 104 may be in axial alignment with a central axis of the motor shaft. In some embodiments, the device 100 and the aperture 104 may be axially aligned with a center bore of the motor shaft, when the motor cover 102 is installed onto the motor, to enable the device 100 to contact the center bore of the motor shaft. Contacting the center bore allows the device 100 to contact a region of the motor shaft surface that has minimum surface trajectory for each revolution, thereby mitigating excessive or premature wear on a grounding brush 136 that contacts the surface of the motor shaft.

In various embodiments, the motor cover 102 may be composed of any of a plurality of metallic materials having a structural rigidity to receive a device 100. In some embodiments, the motor cover 102 material can include a thicknesses suitable for the device 100 to connect to the motor cover 102. It will be understood by those skilled in the art that the motor cover 102 and the device 100 may include any of a plurality of sizes, shapes, dimensions, or any combinations thereof in accordance with this disclosure.

In some embodiments, the device 100 may include a grounding brush 136 at the second end 112. In some embodiments, a grounding brush 136 may be installed into the device 100 as will be further described below. When the motor cover 102 and the device 100 are installed onto the motor, the position of the device 100 relative to the motor cover 102 compresses a spring element 138 (FIG. 4) to apply a force onto the grounding brush 136 as will be further discussed below. In various embodiments described herein, the length, diameter, material features (e.g., hardness, composition, etc.), and the force applied to the grounding brush 136 can impact the life expectancy of the grounding brush 136. Replacing the grounding brush 136 may be achieved with basic hand tools and minimum operator training.

In a non-limiting example of the device 100 and the grounding brush 136, the maximum linear wear of the grounding brush 136 was measured on an AC motor having a maximum speed of 3600 rpm. The grounding brush 136 demonstrated a life expectancy of at least 9,000 hours in continuous operation at 3600 rpm. This life expectancy value, however, is a lower threshold of the life expectancy range for the grounding brush member as the force applied to the grounding brush member was constant during the lifetime, whereas, in various embodiments, the force ($F=-kx$) may decrease due to spring expansion resulting from wear of the grounding brush member. Furthermore, as the lower range threshold for maximum wear was used, some portion of the grounding brush member had not experienced any wear. Thus, the life expectancy of the grounding brush member includes a life expectancy of at least 9,000 hours. In some embodiments, the grounding brush member includes a life expectancy of 9,000 hours or greater. In some embodiments, the grounding brush member includes a life expectancy of greater than 9,000 hours.

In some embodiments, the device 100 may be substantially aligned with a central axis of the motor shaft. Accordingly, the grounding brush may also be substantially aligned with the central axis of the motor shaft. The grounding brush 136 being aligned with the central axis of the motor shaft enables the grounding brush 136 to contact a region of the surface of the motor shaft having a minimum surface trajectory for each revolution. The minimum surface trajectory reduces wear on the grounding brush 136 and may increase the life expectancy of the grounding brush 136 prior to needing replacement. Those skilled in the art will appreciate that the device 100 may be installed into other components and may not be limited to installation into the motor cover 102. For example, in various embodiments, the device 100 may be installed into any of a plurality of other components including, but not limited to, brackets, adapters, motor frame, other components enclosing the motor adjacent the motor shaft, or any combinations thereof in accordance with various embodiments of the present disclosure.

Figure 3A:
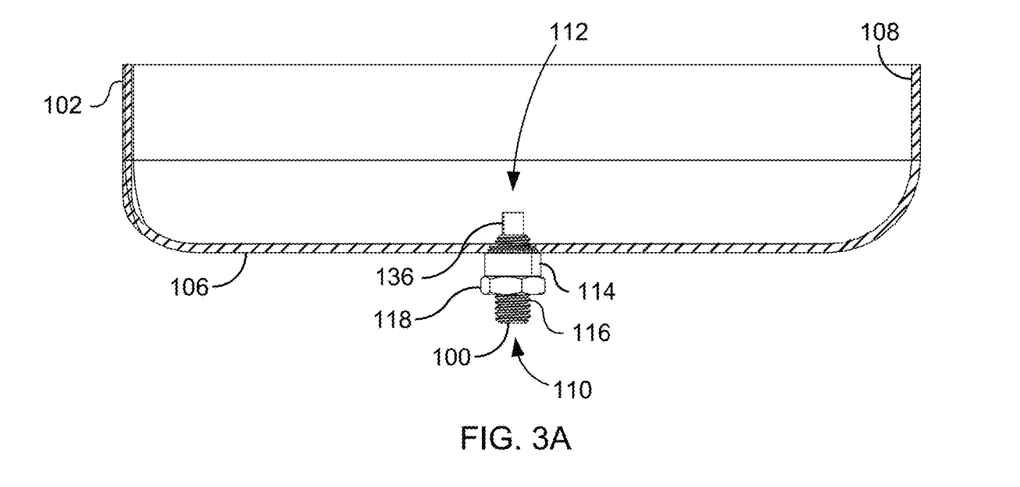
FIG. 3A is a sectional side view of the device 100 and the motor cover 102, according to some embodiments.
Figure 3B:
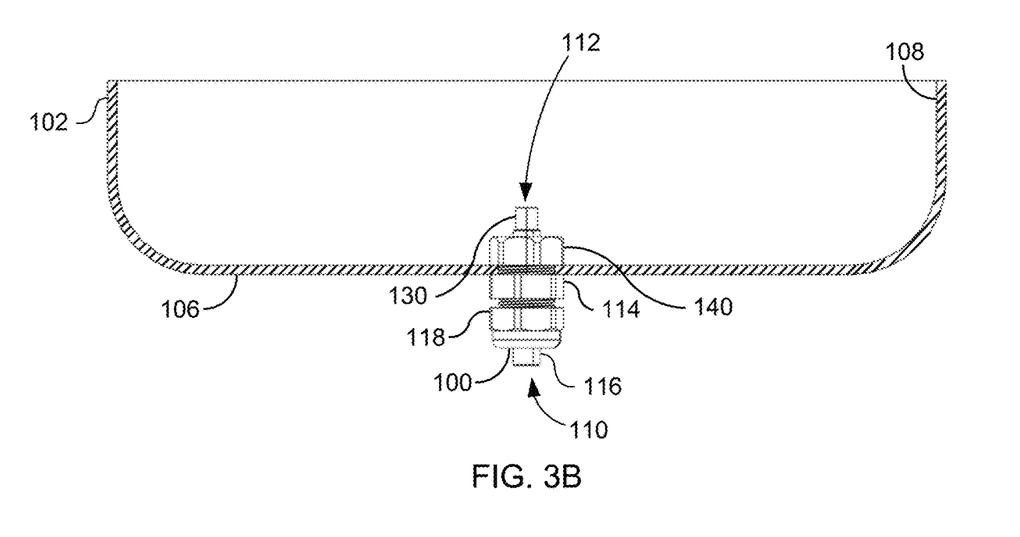
FIG. 3B is a second sectional side view of the device 100 and the motor cover 102, according to some embodiments.

FIG. 3A is a sectional side view of the device 100 and the motor cover 102, according to some embodiments. FIG. 3B is a second sectional side view of the device 100 and the motor cover 102, according to some embodiments. The device 100 is configured to provide for convenient removal and replacement of the grounding brush 136. In some embodiments, the device 100 may provide for replacement of the grounding brush 136 without removal of the motor cover 102 or dismantling of the motor to replace the grounding brush 136 or other members.

The device 100 includes a coupler 114, a brush holder 116, and a lock nut 118. In some embodiments, the device 100 may be made of any of a plurality of electrically conductive materials suitable for providing a discharge path for current. For example, the device 100 may be composed of a conductive material such as stainless steel. In some embodiments, the device 100 may be configured to engage a metallic surface of the motor cover 102 to provide a path to ground through the grounding brush 136. For example, the motor cover 102 may be coated in an insulative coating and the device 100 may engage the metallic substrate of the motor cover 102 below the insulative coating to ground the device 100.

In some embodiments, the coupler 114 may be a press-fit nut. The press-fit nut may be configured to engage the surface of the motor cover 102 to couple the coupler 114 to the motor cover 102 through an interference fit. In some embodiments, the coupler 114 may mechanically bind with the motor cover 102 to retain the coupler 114 in the aperture 104.

Referring to FIG. 3B, in some embodiments, the coupler 114 may extend through the aperture 104 and away from the second side 108 of the motor cover 102. In some embodiments, the device 100 may include a lock nut 140. The lock nut 140 is configured to retain a position of the coupler 114 by threadingly engaging with the coupler 114 at the second side 108 of the motor cover 102 as will be further discussed below.

Figure 4:
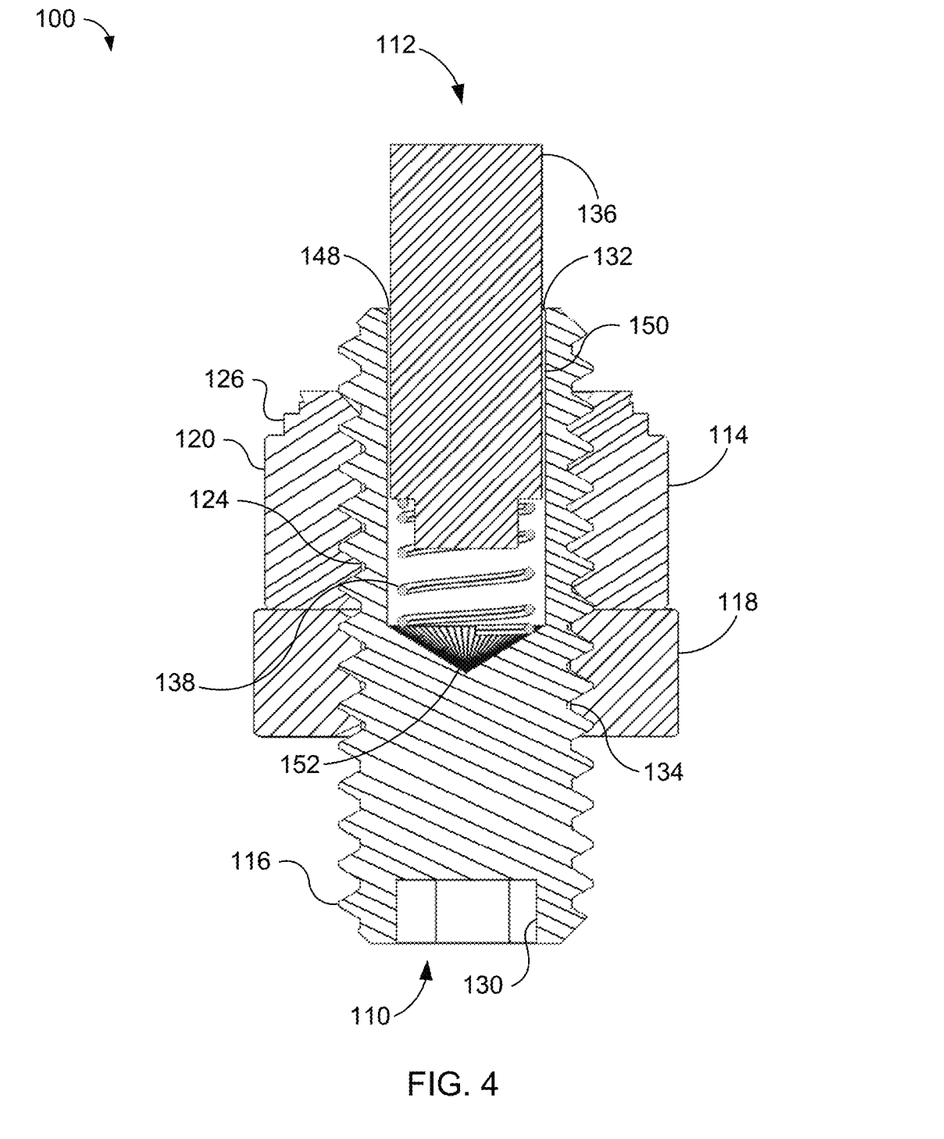
FIG. 4 is a sectional side view of the device 100, according to some embodiments.
Figure 5:
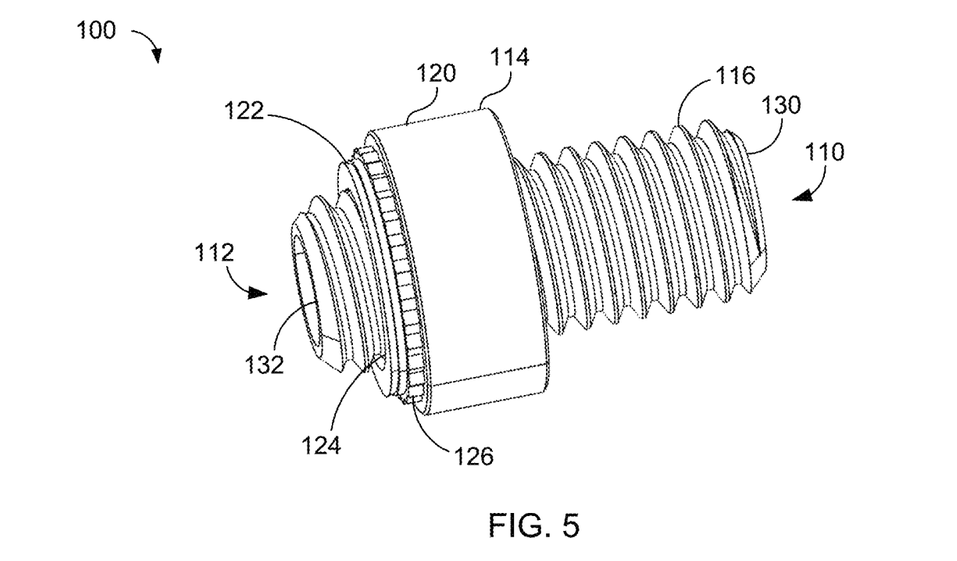
FIG. 5 is a first perspective view of the device 100, according to some embodiments.
Figure 6:
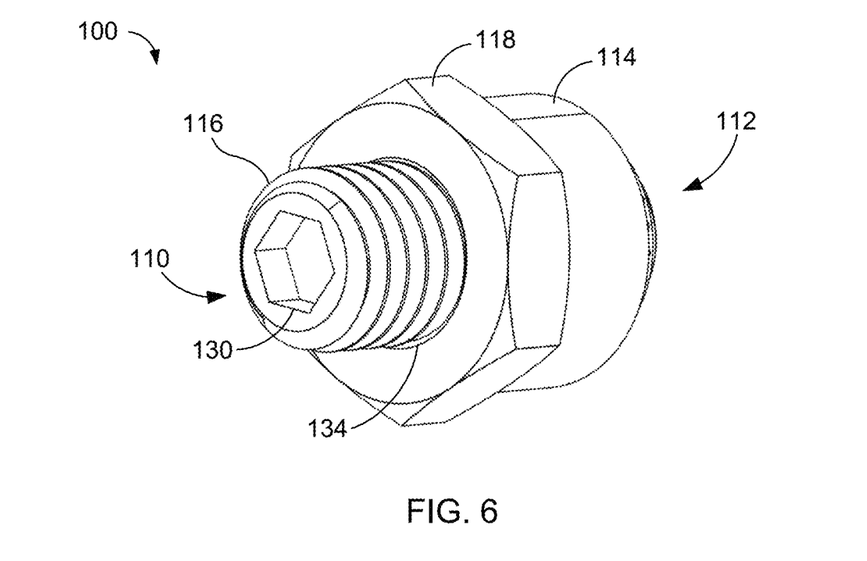
FIG. 6 is a second perspective view of the device 100, according to some embodiments.

FIG. 4 is a sectional side view of the device 100, according to some embodiments. FIG. 5 is a first perspective view of the device 100, according to some embodiments. FIG. 6 is a second perspective view of the device 100, according to some embodiments. Unless noted otherwise, FIGS. 4-6 will be described collectively.

The device 100 includes a coupler 114, a brush holder 116, and a lock nut 118. The coupler 114 includes a head portion 120, a conduit portion 122, and a bore 124. The head portion 120 is located adjacent the first end 110. In some embodiments, the head portion 120 may be cylindrically shaped. The head portion 120 is configured to abut a surface that the coupler 114 extends through. In some embodiments, the coupler 114 is configured to extend through the aperture 104 from the first side 106 to the second side 108 and the head portion 120 is configured to abut the first side 106 of the motor cover 102. The conduit portion 122 extends from the head portion 120 towards the second end 112. In some embodiments, the conduit portion 122 may be cylindrically shaped. In some embodiments, the head portion 120 may be a first diameter and the conduit portion 122 may be a second diameter. The first diameter being greater than the second diameter to allow the head portion 120 to abut the first side 106 of the motor cover 102 while the conduit portion 122 extends through the aperture 104 towards the second end 112. In some embodiments, the conduit portion 122 may be substantially flush with a plane of the second side 108 of the motor cover 102 at the second end 112 of the coupler 114. In some embodiments, the conduit portion 122 may be recessed from a plane of the second side 108 of the motor cover 102 at the aperture 104. This enables the device 100 to be installed into motors with small frame sizes that may not be able to accommodate other larger grounding devices.

The bore 124 axially extends through the coupler 114 from the first end 110 to the second end 112. The bore 124 receives the brush holder 116 that extends through the coupler 114 through the bore 124. In some embodiments, the bore 124 may be a threaded bore that is configured to threadingly engage the brush holder 116 as will be further discussed below.

In various embodiments, the coupler 114 may include a collar portion 126. The collar portion 126 is located between the conduit portion 122 and the head portion 120. Accordingly, in some embodiments, the conduit portion 122 axially extends from the collar portion 126 towards the second end 112. The collar portion 126 is configured to mechanically bind the coupler 114 to the motor cover 102. In some embodiments, the collar portion 126 may mechanically bind with the inner surface of the aperture 104. In some embodiments, the collar portion 126 may be further configured to mechanically bind with other surface of the motor cover 102 including the first side 106, the aperture 104, the second side 108, or any combinations thereof.

In some embodiments, the collar portion 126 may retain the position of the coupler 114 using friction forces. In some embodiments, the coupler 114, the collar portion 126, the motor cover 102, or any combinations thereof may mechanically deform in response to mechanically binding the coupler 114 to the motor cover 102. In some embodiments, the clamping force may be applied using an external clamping device configured to install the coupler 114 onto a metal substrate, including the motor cover 102. In some embodiments, the coupler 114 may be a press-fit nut and the coupler 114 may engage the inner surface of the aperture 104 through an interference fit. In various embodiments, the coupler 114 may bind to the motor cover 102 in response to any of a plurality of forces including, but not limited to, compressive, frictional, interference, mechanical, hydraulic, clamping, other forces, or any combinations thereof. For example, the coupler 114 may be installed into the motor cover 102 using an assembly tool which mechanically binds the coupler 114 to the motor cover 102.

In some embodiments, the collar portion 126 may include a diameter size that is larger than the conduit portion 122 and smaller than the head portion 120. In some embodiments, the diameter of the collar portion 126 may correspond to the diameter of the aperture 104 to enable the collar portion 126 to mechanically bind to the motor cover 102 at the aperture 104. In various embodiments, the dimensions of the collar portion 126 may be based on any of a plurality of factors including, but not limited to, aperture 104 size, coupler 114 size, brush holder 116 size, thickness of the motor cover 102, other factors, or any combinations thereof.

Those skilled in the art will appreciate that the collar portion 126 may include any of a plurality of distinct profiles, geometries, protrusions, recesses, other characteristics, or any combinations thereof to enable the coupler 114 to connect to the motor cover 102, first side 106, aperture 104, other portions, or any combinations thereof to retain the position of the coupler 114 relative to the motor cover 102 in accordance with this disclosure. For example, in some embodiments, the collar portion 126 may include a plurality of ridges protruding outward in the radial direction. The plurality of ridges of the collar portion 126 may be configured to mechanically bind to the motor cover 102 at the aperture 104 to connect the coupler 114 to the motor cover 102.

The brush holder 116 includes a cylindrical body 128, a socket 130, and a receptacle 132. The brush holder 116 is configured to extend through the bore 124. In some embodiments, the brush holder 116 may be configured to slidably extend through the bore 124. In some embodiments, the outer dimensions of the brush holder 116 may correspond to the inner dimensions of the bore 124 to enable the brush holder 116 to slidably extend through the bore 124 without lateral movement by the brush holder 116. In some embodiments, the position of the brush holder 116 relative to the coupler 114 may be based on the distance between the motor substrate and the surface of the motor shaft. In some embodiments, the position of the brush holder 116 relative to the motor shaft may be based on a distance between the motor shaft and the motor substrate (i.e., cover). In some embodiments, the position of the brush holder 116 relative to the motor shaft may be based on a gap between the surface of the motor shaft and the second end 112 of the brush holder 116 to shield the grounding brush. In some embodiments, the position of the brush holder 116 may be further based on the thickness of the motor substrate where the aperture is located.

In various embodiments, the cylindrical body 128 may include a length that enables the brush holder 116 to extend through the coupler 114 that is coupled to the motor cover 102 and towards the motor shaft to enable the grounding brush 136 to contact a surface of the motor shaft. In various embodiments, the position of the cylindrical body 128 may be adjusted to alter the length the brush holder 116 extends from the coupler 114 at the second end 112 as will be further described below.

In some embodiments, the brush holder 116 includes a socket 130 located at the first end 110. The socket 130 is configured to receive an end of a hand tool to adjust the position of the brush holder 116 relative to the coupler 114. In some embodiments, the socket 130 may receive the end of a hand tool to rotate the brush holder 116 in a clockwise or counterclockwise direction to move the brush holder 116 towards or away from the motor shaft. In some embodiments, the socket 130 may include a hexagonal shape and the socket 130 may be configured to receive a hexagonally shaped key of corresponding diameter to adjust the position of the brush holder 116. In some embodiments, the brush holder 116 may be fully withdrawn from the coupler 114 and disconnected from the coupler 114 to replace the grounding brush disposed in the receptacle 132 at the second end 112 adjacent the motor shaft. This allows replacement of the grounding brush without dismantling the motor, such as by removing a cover of the motor to access the motor shaft and the grounding brush located in the receptacle.

The receptacle 132 is defined by the body and is located at the second end 112. In some embodiments, the dimensions of the receptacle 132 may correspond to the grounding brush 136 to minimize the relative sliding velocities between the motor shaft and the grounding brush 136 (i.e., carbon brush). Accordingly, in some embodiments, the dimensions of the receptacle may contribute to extending the life expectancy of the grounding brush 136. In some embodiments, the geometry of the receptacle 132 configured to enable the grounding brush to move in the axial direction and inhibit a rotation of the grounding brush 136 in the receptacle 132. In some embodiments, the dimensions of the brush holder 116 and the receptacle 132 may enable the receptacle 132 to substantially surround the grounding brush 136 and shielding the grounding brush 136 from excessive wear and interference in the movement of the grounding brush 136 in the receptacle 132 that may be caused by the debris. Those skilled in the art will appreciate that the receptacle 132 may include any of a plurality of dimensions capable of retaining the grounding brush 136 in the receptacle 132 while reducing lateral movement of the grounding brush 136 due to the rotation of the motor shaft.

In some embodiments, the receptacle 132 may include an opening 148, a sidewall 150, and a surface 152 opposite the opening 148 defining a bottom of the receptacle 132. In some embodiments, the surface 152 may be an angular surface. In some embodiments, the bottom of the receptacle 132 may angularly extend towards a central axis in the direction of the first end 110. In some embodiments, the device 100 may include the grounding brush 136. The grounding brush 136 is disposed at the receptacle 132 and is configured to contact an angular surface of the motor shaft to provide a discharge path for current. In some embodiments, the grounding brush 136 and the device 100 may provide a grounded discharge path for current.

The lock nut 118 may be defined by a body and include a threaded bore 134. The threaded bore 134 axially extends through the body of the lock nut 118. The threaded bore 134 extends from the first end 110 to the second end 112 of the lock nut 118. In some embodiments, the brush holder 116 may extend through each of the coupler 114 and the lock nut 118.

In some embodiments, the lock nut 118 may be a hex nut. In some embodiments, the lock nut 118 may include any of a plurality of nuts including, but not limited to, lock nuts, hex jam nuts, stover nuts, center lock nuts, flange lock nuts, winged nuts, castle nuts, other nuts, or any combinations thereof. In some embodiments, the lock nut 118 may any of a plurality of other retaining elements including, but not limited to, washers, clamps, pins, clips, rings, other retaining elements, or combinations thereof. For example, in certain illustrative embodiments, the lock nut 118 may be a hex locking nut.

In some embodiments, the bore 124 may be a threaded bore. In some embodiments, the dimensions of the threaded bore 134 may substantially match the dimensions of the bore 124. Furthermore, in some embodiments, the brush holder 116 may include a threaded outer surface having dimensions that correspond to the threads of the bore 124 and the threaded bore 134 of the lock nut 118. Accordingly, in some embodiments, the brush holder 116 may be configured to threadingly engage the coupler 114 and the lock nut 118 by threading the threaded outer surface of the brush holder 116 into the threads of the bore 124 and the threaded bore 134 of the lock nut 118. In some embodiments, a position of the brush holder 116 relative to the coupler 114 may be adjusted by rotating the brush holder 116 in a clockwise or counterclockwise direction to change the position of the brush holder 116 in the axial direction.

In some embodiments, the lock nut 118 engages the threads of the brush holder 116 and can be positioned to abut the end surface of the coupler 114 to retain a position of the brush holder 116 relative to the coupler 114 and the lock nut 118 to prevent the brush holder 116 from changing axial position during the operation of the motor. The lock nut 118 is configured to work in concert with the coupler 114 to retain a position of the brush holder 116 relative to the coupler 114 using friction forces. In some embodiments, the lock nut 118 may be a locking nut configured to limit a rotation of the brush holder 116 by abutting an end of the coupler 114 adjacent the first end 110 and limiting the axial rotation of the brush holder 116 relative to the coupler 114 through friction forces.

Referring to FIG. 4, in some embodiments, the device 100 may include a grounding brush 136 and a spring element 138. The grounding brush 136 may be composed of any of a plurality of materials including, but not limited to, carbon, graphite, copper, silver, steel, metallic powders, conductive nylon, alloys, other conductive materials, or any combinations thereof. For example, in some embodiments, the grounding brush 136 may be a carbon grounding brush. The grounding brush 136 and the spring element 138 are configured to be positioned in the receptacle 132. In some embodiments, the spring element 138 applies a spring force onto the grounding brush 136 to enable the grounding brush 136 to extend in an axial direction away from the brush holder 116 at the second end 112 to contact the motor shaft when the grounding brush 136 and the spring element 138 are installed in the device 100.

In some embodiments, the grounding brush 136 may include a first portion adjacent the first end and a second portion adjacent the second end. In some embodiments, the spring element 138 may be configured to attach to the first portion of the grounding brush 136. In some embodiments, an inner circumference of the spring element 138 may correspond to the outer circumference of the first portion to enable the spring element 138 to attach to the grounding brush 136 through friction forces, such as an interference fit.

The spring element 138 is disposed between the grounding brush 136 and the bottom of the receptacle 132. In some embodiments, the spring element 138 may provide a spring force onto the grounding brush 136 and the surface 152 defining the bottom of the receptacle 132 to compression the grounding brush 136 in the axial direction towards the motor shaft. In some embodiments, the spring element 138 may provide a spring force to continuously compression the grounding brush 136 in the axial direction away from the brush holder 116 and the motor shaft.

The spring element 138 provides a force (F=−kx) in response to compression of the spring element 138. In some embodiments; the compression of the spring element 138 may be due to the position of the brush holder 116 relative to the motor shaft. Furthermore, in some embodiments, the position of the brush holder 116 relative to the motor shaft may be based on any of a plurality of factors including, but not limited to, a size of the grounding brush 136 components, the distance between the motor shaft surface and the motor substrate covering the motor shaft, the desired force applied by the spring element 138 onto the grounding brush 136 and in contact with the motor shaft, or any combinations thereof. In some embodiments, each of the grounding brush 136 and the spring element 138 may include a length configured to enable the spring element 138 to continue applying the force onto the grounding brush 136 when the grounding brush 136 has eroded to a minimum length. In some embodiments, the spring element 138 may be a compressive spring. In some embodiments, the spring element 138 may be a compressive coil spring.

In some embodiments, the device 100 may include a grounding conductor connecting the grounding brush 136 to the brush holder 116 at the receptacle 132. In some embodiments, the grounding conductor may be an electrical conductor. In some embodiments, the grounding conductor may be in connection with a ground terminal to ground the grounding brush 136 and the motor shaft.

In some embodiments, the grounding brush 136 may be configured to be replaced after the hours of operation of the motor exceeds a life expectancy of the grounding brush 136. For example, the grounding brush 136 may be replaced every 9000 hours of operation of the motor. In some embodiments, the brush holder 116 may be configured to be withdrawn from the coupler 114 to provide access to the grounding brush 136 in the receptacle 132 at the second end 112. In some embodiments, withdrawing the brush holder 116 from the coupler 114 may include threadingly disengaging the brush holder 116 from the coupler 114 to remove the brush holder 116. Consequently, in some embodiments, the grounding brush 136, the spring element 138, or combinations thereof may be replaced based on wear on the respective components. In some embodiments, when installing the grounding brush 136, the grounding brush 136 may be inserted into the receptacle 132 and the second end 112 of the brush holder 116 may be reinstalled into the bore 124 of the coupler 114 until the position of the brush holder 116 is returned to an original position. In some embodiments, the grounding brush 136 may be replaced without removing the motor cover 102.

In some embodiments, the brush holder 116 may be axially positioned relative to the surface of the motor shaft to compress the spring element 138 in the receptacle 132. In some embodiments, the axial position of the brush holder 116 relative to the surface of the motor shaft may be further adjustable to enable the receptacle 132 to substantially enclose the grounding brush 136. In some embodiments, the brush holder 116 and the receptacle 132 may shield the grounding brush 136 from debris, or other particulate, in the motor from coming into contact with the grounding brush 136 and potentially negatively impacting the expected lifespan of the grounding brush 136, the engagement of the grounding brush 136 onto the motor shaft surface, or an effectiveness of the discharge provided by the device 100. In some embodiments, the position of the brush holder 116 relative to the surface of the motor shaft may be close enough to allow only a minimal portion of the grounding brush 136 to protrude from a plane of the second end 112 of the brush holder 116 without the brush holder 116 corning into contact with the motor shaft.

Figure 7:
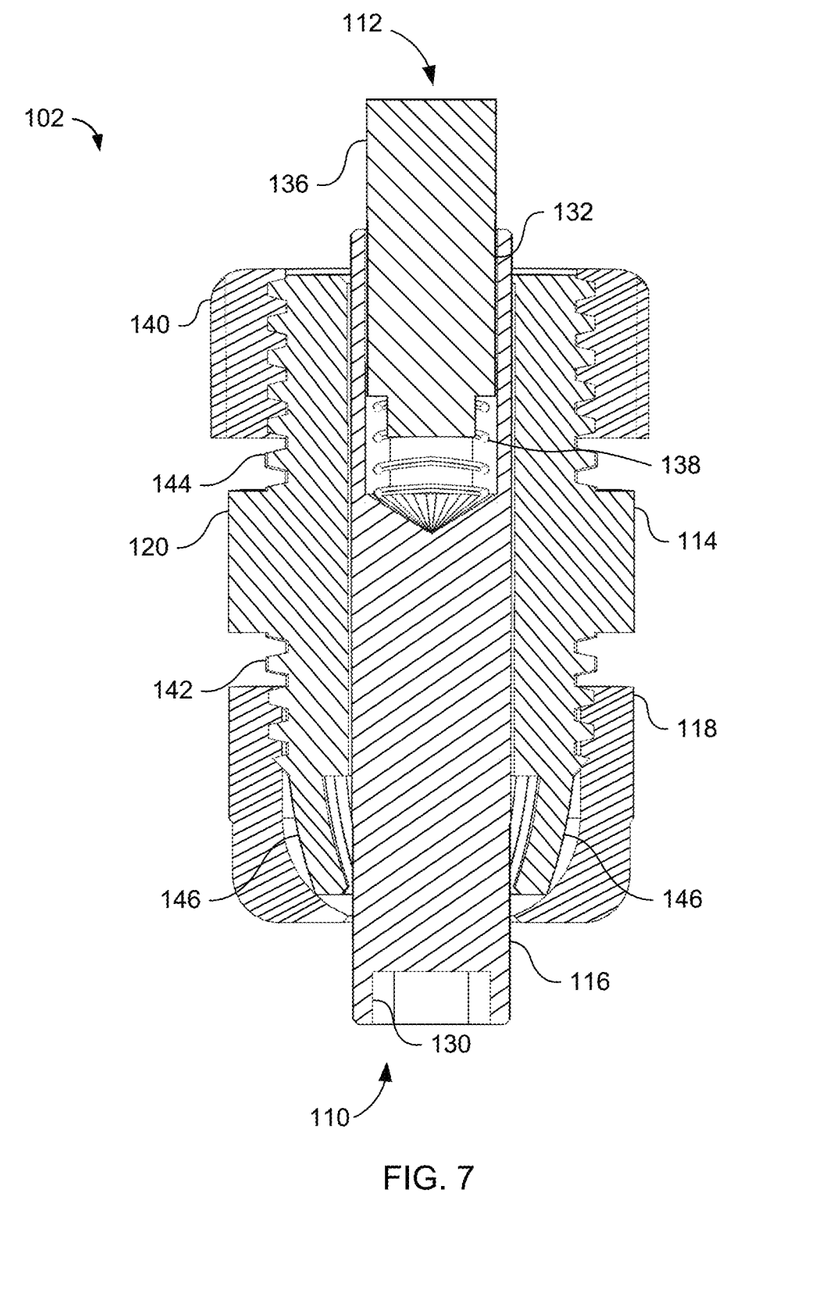
FIG. 7 is a sectional side view of the device 100, according to some embodiments.

FIG. 7 is a sectional side view of the device 100, according to some embodiments. In some embodiments, the brush holder 116 may further include a first threaded portion 142, a second threaded portion 144, and a clamping portion 146. The first threaded portion 142 extends from the head portion 120 towards the first end 110. The second threaded portion 144 extends from the head portion 120 towards the second end 112. In some embodiments, the second threaded portion 144 may be located on the outer surface of the conduit portion 122. In some embodiments, the lock nut 140 may be configured to threadingly engage the threads of the second threaded portion 144 to retain the position of the coupler 114 relative to the motor cover 102. Accordingly, in some embodiments, the lock nut 140 may thread onto the second threaded portion 144 of the coupler 114 until the lock nut 140 abuts the second side 108 of the motor cover 102 and the head portion 120 abuts the first side 106 of the motor cover 102.

The clamping portion 146 is located at the first end 110 of the coupler 114. The clamping portion 146 is configured to allow the brush holder 116 to be inserted through the bore 124 at the first end 110 and to extend towards the second end 112. In some embodiments, the clamping portion 146 may include a prong that curves inward in a radial direction. In some embodiments, the prong may be a plurality of prongs that extend from the outer circumference of the cylindrical body 128 of the brush holder 116. In some embodiments, the lock nut 118 may be configured to threadingly engage the threads of the first threaded portion 142. Furthermore, in some embodiments, the lock nut 118 may further include dimensions which compress the prong of the clamping portion 146 inward onto the brush holder 116 that is positioned through the bore 124 of the coupler 114 to retain the position of the brush holder 116 relative to the coupler 114.

Figure 8A:
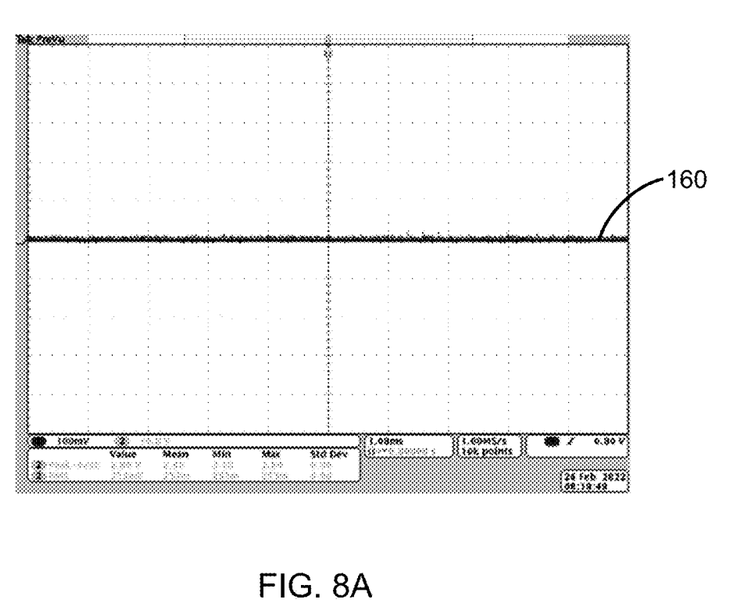
FIG. 8A is a graphical illustration depicting a shaft voltage of a motor including the device 100, according to some embodiments.
Figure 8B:
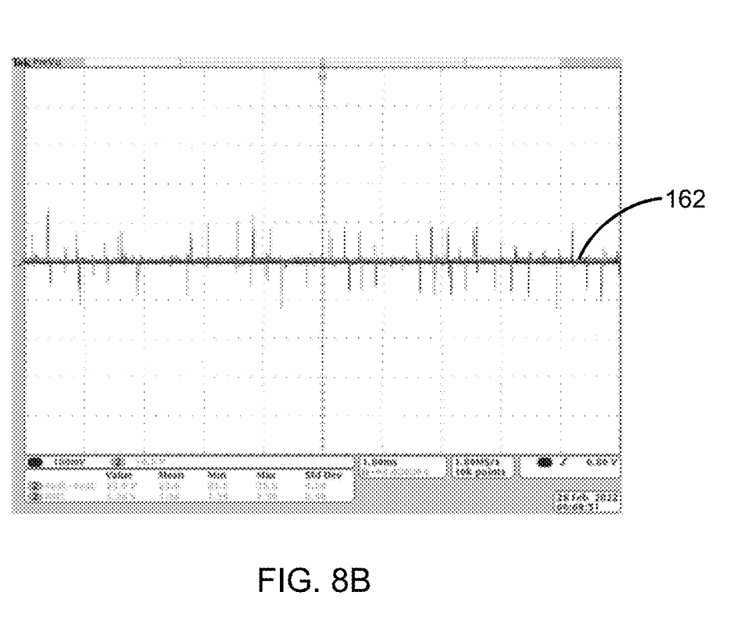
FIG. 8B is a graphical illustration depicting the shaft voltage of a motor not including the device 100, according to some embodiments.

FIG. 8A is a graphical illustration depicting a shaft voltage of a motor including the device 100, according to some embodiments. FIG. 8B is a graphical illustration depicting the shaft voltage of the motor not including the device 100, according to some embodiments. Unless stated otherwise, FIGS. 8A and 8B will be described collectively.

In a non-limiting example, the shaft voltage of two similar AC motors having similar design characteristics and similar operating conditions were monitored, as shown in FIGS. 8A and 8B. The AC motor is a 1 hp motor having a frame size of 56 and a maximum speed of 3600 rpm. The first AC motor, FIG. 8A, includes the device 100 providing a current discharge path to ground. The second AC motor, FIG. 8B, was operated without the device 100. The first and second AC motors were simultaneously operated and monitored while driven from a single drive having a switching frequency of 4 kHz to ensure the motors were controlled from the same excitation pulse width modulation ("PWM") voltage. Furthermore, the first and second AC motors included the same length power supply cable to mitigate variation due to power supply cable length. Referring to FIG. 8A, in a non-limiting example, the first AC motor generated a first shaft voltage 160. Referring to FIG. 8B, in a non-limiting example, the second AC motor generated a second shaft voltage 162. The first AC motor exhibited a first shaft voltage 160, FIG. 8A, having a reduced magnitude of the peak-to-peak voltage by approximately 90% compared to the second shaft voltage 162 of the second AC motor, FIG. 8B.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

Aspects

Various Aspects are described below. It is to be understood that any one or more of the features recited in the following Aspect(s) can be combined with any one or more other Aspect(s).

Aspect 1. An apparatus comprising: a first end; a second end; a coupler configured to extend through an aperture from a first side to a second side of a motor cover, the coupler comprising: a head portion, a conduit portion extending from the head portion towards the second end, and a first bore axially extending through the coupler; a brush holder extending through the first bore, the brush holder comprising: a cylindrical body, a socket at the first end, and a receptacle at the second end; and a first lock nut comprising: a first threaded bore axially extending through the nut.

Aspect 2. The apparatus according to aspect 1, wherein the first end comprises: a second threaded bore.

Aspect 3. The apparatus according to aspect 2, wherein the brush holder further comprises: a threaded outer surface; wherein the threaded outer surface of the cylindrical body is configured to threadingly engage the first threaded bore and the second threaded bore.

Aspect 4. The apparatus according to any one of the preceding aspects, wherein the conduit portion further comprises a plurality of ridges, wherein the plurality of ridges is configured to mechanically bind with a surface of the motor cover to retain a position of the coupler.

Aspect 5. The apparatus according to any one of aspects 1 and 4, wherein the coupler further comprises: a first threaded portion extending from the head portion towards the first end, a second threaded portion disposed on the conduit portion, a clamping portion at the first end, wherein the clamping portion is configured to engage a surface of the brush holder to retain a position of the brush holder, and wherein the first lock nut is configured to threadingly engage the first threaded portion and apply a clamping force onto the clamping portion to retain the position of the brush holder relative to the coupler.

Aspect 6. The apparatus according to any one of aspects 1, 4, or 5, further comprising: a second lock nut comprising: a third threaded bore; wherein the second lock nut is configured to threadingly engage the second threaded portion at the second side of the motor cover to retain a position of the coupler relative to the motor cover.

Aspect 7. The apparatus according to any of the preceding aspects, further comprising: a grounding brush, and a spring element, wherein the spring element is configured to apply a spring force onto the grounding brush and the receptacle, wherein the spring force enables the grounding brush to contact a surface of a motor shaft.

Aspect 8. The apparatus according to any of the preceding aspects, wherein the coupler comprises a press-fit nut.

Aspect 9. The apparatus according to any of the preceding aspects, wherein the first lock nut is configured to retain an axial position of the brush holder relative to the coupler.

Aspect 10. A device comprising: a first end; a second end; a press-fit nut configured to extend through an aperture from a first side of a motor cover to a second side of the motor cover, the press-fit nut comprising: a head portion, a conduit portion configured to extend into the aperture towards the second end, and a first bore extending from the first end to the second end, wherein the conduit portion is further configured to engage a surface of the motor cover to retain a position of the press-fit nut in the aperture; a brush holder configured to extend through the first bore, the brush holder comprising: a cylindrical body, a socket at the first end, and a receptacle at the second end; a first lock nut comprising: a first threaded bore extending through the first lock nut; a grounding brush; and a spring element, wherein the spring element is configured to apply a spring force onto the grounding brush and the receptacle, wherein the spring force enables the grounding brush to contact a surface of a motor shaft.

Aspect 11. The device according to aspect 10, wherein the first bore comprises: a second threaded bore.

Aspect 12. The device according to any one of aspects 10 or 11, wherein the brush holder further comprises: a threaded outer surface; wherein the threaded outer surface of the brush holder is configured to threadingly engage the first threaded bore and the second threaded bore.

Aspect 13. The device according to any one of aspects 10, 11, or 12, wherein the press-fit nut further comprises: a first threaded portion between the head portion and the first end, a second threaded portion between the conduit portion and the second end, and a clamping portion at the first end, wherein the clamping portion is configured to engage a surface of the brush holder to retain a position of the brush holder, wherein the first lock nut is configured to threadingly engage the first threaded portion at the first end and to apply a clamping force onto the clamping portion to retain the position of the brush holder relative to the press-fit nut.

Aspect 14. The device according to aspect 13, further comprising: a second lock nut comprising: a third threaded bore; wherein the second lock nut is configured to threadingly engage the second threaded portion at the second side of the motor cover to retain the position of the press-fit nut.

Aspect 15. The device according to any one of aspects 10, 11, 12, 13, or 14, wherein the conduit portion further comprises a plurality of ridges traversing an outer circumference of the conduit portion, wherein the plurality of ridges is configured to mechanically bind with the surface of the motor cover to retain the position of the press-fit nut.

Aspect 16. The device according to any one of aspects 10, 11, 12, 13, 14, or 15, wherein the first lock nut is configured to retain an axial position of the brush holder relative to the press-fit nut.

Aspect 17. An assembly comprising: a first end; a second end; a press-fit nut configured to extend through an aperture from a first side to a second side of a motor cover, the press-fit nut comprising: a head portion adjacent the first end, a conduit portion extending from the head portion towards the second end, and a first bore axially extending through the press-fit nut; a brush holder configured to extend through the first bore, the brush holder comprising: a cylindrical body, a socket at the first end, and a receptacle at the second end; a first lock nut comprising: a first threaded bore axially extending through the first lock nut, wherein the first lock nut is configured to retain an axial position of the brush holder relative to the press-fit nut.

Aspect 18. The assembly according to aspect 17, further comprising: a grounding brush, a spring element, wherein the spring element is configured to apply a spring force onto the grounding brush and the receptacle, wherein the spring force enables the grounding brush to contact a surface of a motor shaft.

Aspect 19. The assembly according to any one of aspects 17 or 18, wherein the first bore comprises: a second threaded bore.

Aspect 20. The assembly according to aspect 19, wherein the brush holder further comprises: a threaded outer surface, wherein the threaded outer surface of the brush holder is configured to threadingly engage the first threaded bore and the second threaded bore.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. An apparatus comprising:
   a first end;
   a second end;
   a coupler configured to extend through an aperture from a first side to a second side of a motor cover, the coupler comprising:
      a head portion,
      a conduit portion extending from the head portion towards the second end, and
      a first bore axially extending through the coupler;
   a brush holder extending through the first bore, the brush holder comprising:
      a cylindrical body,
      a socket at the first end, and
      a receptacle at the second end; and
   a first lock nut comprising:
      a first threaded bore axially extending through the nut.

2. The apparatus according to claim 1, wherein the first bore comprises:
   a second threaded bore.

3. The apparatus according to claim 2, wherein the brush holder further comprises:
   a threaded outer surface;
      wherein the threaded outer surface of the cylindrical body is configured to threadingly engage the first threaded bore and the second threaded bore.

4. The apparatus according to claim 1, wherein the conduit portion further comprises a plurality of ridges,
   wherein the plurality of ridges is configured to mechanically bind with a surface of the motor cover to retain a position of the coupler.

5. The apparatus according to claim 1, wherein the coupler further comprises:
   a first threaded portion extending from the head portion towards the first end,
   a second threaded portion disposed on the conduit portion,
   a clamping portion at the first end,
      wherein the clamping portion is configured to engage a surface of the brush holder to retain a position of the brush holder, and
   wherein the first lock nut is configured to threadingly engage the first threaded portion and apply a clamping force onto the clamping portion to retain the position of the brush holder relative to the coupler.

6. The apparatus according to claim 5, further comprising:
   a second lock nut comprising:
      a third threaded bore;
      wherein the second lock nut is configured to threadingly engage the second threaded portion at the second side of the motor cover to retain a position of the coupler relative to the motor cover.

7. The apparatus according to claim 1, further comprising:
a grounding brush, and
a spring element,
wherein the spring element is configured to apply a spring force onto the grounding brush and the receptacle,
wherein the spring force enables the grounding brush to contact a surface of a motor shaft.

8. The apparatus according to claim 1, wherein the coupler comprises a press-fit nut.

9. The apparatus according to claim 1, wherein the first lock nut is configured to retain an axial position of the brush holder relative to the coupler.

10. A device comprising:
a first end;
a second end;
a press-fit nut configured to extend through an aperture from a first side of a motor cover to a second side of the motor cover, the press-fit nut comprising:
a head portion,
a conduit portion configured to extend into the aperture towards the second end, and
a first bore extending from the first end to the second end,
wherein the conduit portion is further configured to engage a surface of the motor cover to retain a position of the press-fit nut in the aperture;
a brush holder configured to extend through the first bore, the brush holder comprising:
a cylindrical body,
a socket at the first end, and
a receptacle at the second end;
a first lock nut comprising:
a first threaded bore extending through the first lock nut;
a grounding brush; and
a spring element,
wherein the spring element is configured to apply a spring force onto the grounding brush and the receptacle,
wherein the spring force enables the grounding brush to contact the surface of a motor shaft.

11. The device according to claim 10, wherein the first bore comprises:
a second threaded bore.

12. The device according to claim 11, wherein the brush holder further comprises:
a threaded outer surface;
wherein the threaded outer surface of the brush holder is configured to threadingly engage the first threaded bore and the second threaded bore.

13. The device according to claim 10, wherein the press-fit nut further comprises:
a first threaded portion between the head portion and the first end,
a second threaded portion between the conduit portion and the second end, and
a clamping portion at the first end,
wherein the clamping portion is configured to engage a surface of the brush holder to retain a position of the brush holder,
wherein the first lock nut is configured to threadingly engage the first threaded portion at the first end and to apply a clamping force onto the clamping portion to retain the position of the brush holder relative to the press-fit nut.

14. The device according to claim 13, further comprising:
a second lock nut comprising:
a third threaded bore;
wherein the second lock nut is configured to threadingly engage the second threaded portion at the second side of the motor cover to retain the position of the press-fit nut.

15. The device according to claim 10, wherein the conduit portion further comprises a plurality of ridges traversing an outer circumference of the conduit portion,
wherein the plurality of ridges is configured to mechanically bind with the surface of the motor cover to retain the position of the press-fit nut.

16. The device according to claim 10, wherein the first lock nut is configured to retain an axial position of the brush holder relative to the press-fit nut.

17. An assembly comprising:
a first end;
a second end;
a press-fit nut configured to extend through an aperture from a first side to a second side of a motor cover, the press-fit nut comprising:
a head portion adjacent the first end,
a conduit portion extending from the head portion towards the second end, and
a first bore axially extending through the press-fit nut;
a brush holder configured to extend through the first bore, the brush holder comprising:
a cylindrical body,
a socket at the first end, and
a receptacle at the second end;
a first lock nut comprising:
a first threaded bore axially extending through the first lock nut,
wherein the first lock nut is configured to retain an axial position of the brush holder relative to the press-fit nut.

18. The assembly according to claim 17, further comprising:
a grounding brush,
a spring element,
wherein the spring element is configured to apply a spring force onto the grounding brush and the receptacle,
wherein the spring force enables the grounding brush to contact a surface of a motor shaft.

19. The assembly according to claim 17, wherein the first bore comprises:
a second threaded bore.

20. The assembly according to claim 19, wherein the brush holder further comprises:
a threaded outer surface,
wherein the threaded outer surface of the brush holder is configured to threadingly engage the first threaded bore and the second threaded bore.

* * * * *